United States Patent [19]

Neuhaus et al.

[11] Patent Number: 4,882,363
[45] Date of Patent: Nov. 21, 1989

[54] PROCESS FOR THE PRODUCTION OF POLYURETHANE FOAM MOLDINGS

[75] Inventors: Alfred Neuhaus, Leverkusen; Otto Ganster; Manfred Mengal, both of Odenthal, all of Fed. Rep. of Germany

[73] Assignee: Bayer Aktiengesellschaft, Leverkusen, Fed. Rep. of Germany

[21] Appl. No.: 280,610

[22] Filed: Dec. 6, 1988

[30] Foreign Application Priority Data

Dec. 11, 1987 [DE] Fed. Rep. of Germany ....... 3742122

[51] Int. Cl.$^4$ .............................. C08J 9/00; C08J 9/12
[52] U.S. Cl. ..................... 521/122; 523/219; 521/54
[58] Field of Search ................. 521/54, 122; 523/219

[56] References Cited

U.S. PATENT DOCUMENTS

| | | | |
|---|---|---|---|
| 3,978,263 | 8/1976 | Wellensiek | 428/327 |
| 4,275,172 | 6/1981 | Borth et al. | 521/123 |
| 4,526,906 | 7/1985 | Wegner | 521/159 |
| 4,649,162 | 3/1987 | Roche | 521/133 |
| 4,737,525 | 4/1988 | Blount | 521/122 |
| 4,740,527 | 4/1988 | Von Bonin | 521/167 |
| 4,743,628 | 5/1988 | Conkey et al. | 521/167 |

FOREIGN PATENT DOCUMENTS 1209243 10/1970 United Kingdom .
1285224 8/1972 United Kingdom .

Primary Examiner—Morton Foelak
Attorney, Agent, or Firm—Gene Harsh; Joseph C. Gil; Thomas W. Roy

[57] ABSTRACT

The present invention relates to a process for the production of fluorocarbon-free, rigid polyurethane foam moldings having a gross density of at least 300 kg/m$^3$ by in-mold foaming of a reaction mixture based on
(a) a polyisocyanate component containing at least one aromatic polyisocyanate,
(b) a polyhydroxyl component,
(c) blowing agents,
(d) catalysts and
(e) zeolitic adsorbents,
at an isocyanate index of about 75 to 150, characterized in that
(b) an organic polyhydroxyl compound or a mixture of organic polyhydroxyl compounds having an (average) hydroxyl functionality of at least 2.2 and an (average) OH number of at least 300 mg KOH/g is used as the polyhydroxyl component,
(c) water and/or carbon dioxide is/are used as the blowing agent and
(e) the zeolitic adsorbents have a pore diameter of at least 0.7 nm.

2 Claims, No Drawings

PROCESS FOR THE PRODUCTION OF POLYURETHANE FOAM MOLDINGS

BACKGROUND OF THE INVENTION

1. Field of the Invention

This invention relates to a new process for the production of chlorofluorocarbon-free, rigid polyurethane foam moldings having a huih surface hardness and a gross density of at least 300 kg/m³ using water and/or carbon dioxide in combination with special zeolites as blowing agents.

2. Description of the Prior Art

The production of rigid polyurethane foam moldings is described, for example, in DE-AS 1,694,138. The moldings in question are moldings having a compact outer skin and a differential distribution of density over the cross-section of the molding. Foams such as these are generally known as "integral foams."

The use of low-boiling solvents as blowing agents is crucial to the formation of this "integral structure." Particularly suitable solvents are chlorofluorocarbons (CFC) R 11 and R 113.

The importance of these blowing agents to the integral structure is emphasized by the fact that foaming formulations, in which the $CO_2$ produced by the reaction of $H_2O$ with isocyanate is used solely or even only partly as blowing agent, are unable to form this particular foam structure because even small quantities of water produce a skin permeated by fine cells. The result of this is that the surface hardness (Shore A, D) of such foam moldings is considerably lower than that of comparable integral foams produced with the blowing agents R 11 or R 113.

In many practical applications, however, surface hardness plays a crucial role. For example, in the production of moldings for monitor housings or switch boxes, a surface hardness of at least 70 Shore D is absolutely essential because the moldings must be scratch-resistant. Previously, it has only been possible for a standard density of 600 kg/m³ to achieve this hardness with the usual formulations when low-boiling chlorofluorocarbons are used as blowing agents.

An object of the present invention is to provide a new process for the production of rigid polyurethane foam moldings having a compact surface skin of extreme hardness which does not depend on the use of chlorofluorocarbons as blowing agents.

Surprisingly, this object is achieved by the use of water and/or carbon dioxide in combination with selected zeolitic adsorbents as blowing agents and, at the same time, by the use of selected polyhydroxyl compounds as the principal reactant for the polyisocyanate component.

The production of polyurethane foams having a compact surface and a cellular core using alkali aluminum silicates of zeolite structure is already known from DE-OS 1,804,362. However, the foams according to this prior publication are light-density foams having a gross density of about 80 to120 kg/m³. The main concern of the authors of this prior publication was to produce non-shrinking foams despite the use of chlorofluorocarbons. Accordingly, these blowing agents are used in all of the examples although water is also mentioned as the sole blowing agent in Claim 1 of the prior publication. However, this cannot in any way suggest the process according to the invention which is described in detail hereinafter, because the object is the invention (extreme surface hardness despite not using chlorofluorocarbons) is not discussed in the prior publication nor is the proposed solution according to the invention, according to which water, preferably in combination with selected zeolites, is used for the production of polyurethane moldings of comparatively high density and high surface hardness.

SUMMARY OF THE INVENTION

The present invention relates to a process for the production of fluorocarbon-free, rigid polyurethane foam moldings having a gross density of at least 300 kg/m³ by in-mold foaming of a reaction mixture based on (a) a polyisocyanate component containing at least one aromatic polyisocyanate,
(b) a polyhydroxyl component,
(c) blowing agents,
(d) catalysts and
(e) zeolitic adsorbents, at an isocyanate index of about 75 to 150, characterized in that (b) an organic polyhydroxyl compound or a mixture of organic polyhydroxyl compounds having an (average) hydroxyl functionality of at least 2.2 and an (average) OH number of at least 300 mg KOH/g is used as the polyhydroxyl component,
(c) water and/or carbon dioxide is/are used as the blowing agent and
(e) the zeolitic adsorbents have a diameter of at least 0.7 nm.

DETAILED DESCRIPTION OF THE INVENTION

The polyisocyanate component (a) may be an aromatic polyisocyanate having an NCO content of at least about 20% by weight. It is particularly preferred to use known polyisocyanate mixtures of the diphenyl methane series of the type obtainable, for example, by the phosgenation of aniline/formaldehyde condensates. These polyisocyanate mixtures, which are particularly suitable for the process according to the invention, generally contain about 50 to 100% by weight of diisocyanatodiphenyl methane isomers, while the remainder is based on higher homologs of these diisocyanates. The diisocyanates present in these mixtures contain 4,4'-diisocyanatodiphenyl methane in admixture with up to about 60% by weight, based on the total quantity of the diisocyanates, of 2,4'-diisocyanatodiphenyl methane and, optionally, small quantities of 2,2'-diisocyanatodiphenyl methane. Urethane-, carbodiimide- or allophanate-modified derivatives of these polyisocyanates may also be used as the polyisocyanate component (a).

The polyhydroxy component (b) is based on at least one organic polyhydroxyl compoud, preferably a mixture of several organic polyhydroxyl compounds. Component (b) has an (averge) hydroxyl functionality of at least 2.2, preferably at least 2.7, and an (average) hyroxyl value of at least 300 mg KOH/g, preferably at least 400 mg KOH/g. The individual constituents of the polyhydroxyl component (b) are, in particular, known polyether polyols of the type obtainable by the alkoxylation of suitable starter molecules. Suitable starter molecules include water, propylene glycol, glycerol, trimethylolpropane, cane sugar or mixtures of such starter molecules. Preferred alkoxylating agents include propylene oxide and, optionally, ethylene oxide which may be used in admixture with propylene oxide or separately in separate reaction steps during the alkoxylation reaction.

In addition to polyether polyols of the type mentioned above, the polyhydroxyl component (b) may also contain simple alkane polyols such as ethylene glycol, propylene glycol, trimethylolpropane and/or glycerol, as mixing component. The standard polyester polyols of the prior art may also be used as part of component (b), provided that they satisfy the requirements stated above.

The polyol component (b) is often used in air-charged form. An air charge of up to about 35% by volume, based on atmospheric pressure, is standard.

Water and/or carbon dioxide are used as the blowing agent (c). When water is used as sole blowing agent, the total quantity of water introduced into the reaction mixture, including the water bound to the zeolitic adsorbents, is at least 0.5% by weight, preferably about 1.0 to 2.0% by weight, based on the weight of component (b). The water may be incorporated in the reaction mixture as such or in the form of water-containing zeolite. When carbon dioxide is used as a blowing agent, this gas is preferably introduced with stirring for fine distribution into the polyol component (b), which contains the dry zeolite in finely dispersed form. it is rapidly taken up by the dispersed zeolite. The $C_2$ may also be adsorbed beforehand onto the dry powdered zeolitic adsorbent and added to the polyol component in this form. By "dry zeolite" is meant the product dried at elevated temperature, for example at 400° C., although it may still contain up to at most 2% by weight water. The residual water, if any, present in the zeolite is normally no longer accessible to the isocyanate addition reaction. However, this residual water is taken into account in the calculation of the isocyanate index. When carbon dioxide is used as the sole blowing agent (the procedure involved in this case is one in which a total of at most 2% by weight water, based on the weight of the completely anhydrous zeolite, is present in the reaction mixture), it is used in quantities of at least 1.2% by weight, preferably about 2.4 to 5.0% by weight, based on the weight of component (b). When water and carbon dioxide together are used in combination (this is less preferred for the purposes of the invention), the total quantity of these blowing agents has to be selected in such a way that the mold is satisfactorily filled with foam. In general, the total quantity of carbon dioxide plus water in this embodiment is about 1.2 to 2.5% by weight, based on the weight of component (b).

Catalysts (d) include the known tertiary amines which accelerate the isocyanate polyaddition reaction (such as triethylenediamine, N,N-dimethyl aniline or N,N-dimethyl cyclohexylamine) or organometallic compounds, particularly tin compounds (such as tin(II) octoate or dibutyltin diluarate). According to the invention, it is also possible to use trimerization catalysts, for example, alkali acetates such as sodium or potassium acetate; alkali phenolates such as sodium phenolate or sodium trichlorophenolate; 2,4,6-tris-(dimethylaminomethyl)-phenol; and also lead naphthenate, lead benzoate or lead octoate, if it is intended to produce polyurethane foams containing isocyanurate groups.

Auxiliaries (e), which are essential to the invention, are zeolitic adsorbents, i.e. alkali alumino-silicates or alkali/alkaline earth aluminosilicates having a pore opening diameter of at least 0.7 nm. Particularly suiable zeolitic adsorbents are synthetic zeolites which satisfy these requirements (cf. Ullmanns Enzyklopadie der Technischen Chemie, 4th Edition, Mo-3118 Vol. 17, pages 9-18, Verlag Chemie, Weinheim/N.Y.).

The zeolitic adsorbents are generally used in the form of powders having a maximum particle diameer of 100 $\mu$m, preferably of $\leq 10$ $\mu$m.

Zeolitic adsorbents particularly suitable for the process according to the invention are synthetic zeolites of the faujasite type having the following general formula

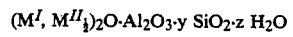

$(M^I, M^{II}{}_{\frac{1}{2}})_2O \cdot Al_2O_3 \cdot y\ SiO_2 \cdot z\ H_2O$ in which
 $M^I$ represents sodium or potassium cations,
 $M^{II}$ represents calcium or magnesium cations,
 y has a value of 2 to 6, synthetic zeolites of the x type having a y-value of 2 to 3 and those of the y type having a y-value of 3 to 6 and
 z represents 0 or a number of up to 5.5 (X type) or 0 or a number of up to 8 (Y type).

A zeolite X of the type marketed, for example, under the name Baylith W by Bayer AG, Leverkusen, is particularly suitable.

According to the invention, the zeolitic adsorbents (expressed as anhydrous zeolite) are generally used in quantities of about 2.5 to 50% by weight, preferably in quantities of about 5 to 25% by weight, based on the weight of component b). When water is used as the sole blowing agent, the zeolites (expressed as anhydrous zeolite) are generally used in such a quantity that the water introduced into the reaction mixture, including the water present in the zeolite, makes up about 5 to 25% by weight and preferably about 10 to 25% by weight of the zeolite component. The expression "anhydrous zeolite" means a zeolitic material having a water content of 0%. The term "dry zeolite" refers to a zeolitic material having a water content of at most 2% by weight.

In addition to the zeolite adsorbents, other auxiliaries and additives may be used in the process according to the invention including foam stabilizers (such as those based on polyether-modified polysiloxanes), flame-proofing agents, internal mold release agents, etc The process according to the invention is generally carried out by first mixing the starting components (b) to (e) with one another and then combining the resulting mixture with polyisocyanate component (a). The mixing process is carried out, for example, using stirred mixers or preferably using standard high-pressure mixing units of the type normally used for the production of polyurethane foams. The mold is filled immediately after preparation of the reaction mixture. The quantity of reaction mixture introduced into the mold is selected in such a way that a gross density of at least 300 kg/m$^3$, preferably about 500 to 750 kg/m$^3$ is obtained. The temperature of the molds is generally at least 30° C., preferably at least 50° C. If necessary, the inner walls of the molds may be coated before filling with known external mold release agents.

It is possible by the process according to the invention, even when omitting chlorofluorocarbons, to produce high-quality rigid polyurethane foam moldings having a hard, compact surface.

The inventionis further illustrated but is not intended to be limited by the following examples in which all parts and percentages are by weight unless otherwise specified.

EXAMPLES

Starting materials:

Components (a)

A polyisocyanate mixture of the diphenyl methane series having an NCO content of 31% by weight and a content of isomeric diisocyanatodiphenyl methanes of 60% by weight, specifically 55% by weight of 4,4'-diisocyanatodiphenyl methane and about 5% by weight of 2,4'-diisocyanatodiphenyl methane.

Polyol component (b1):

A propoxylation product of trimethylolpropane having an OH number of 860.

Polyol component (b2):

A propyoxylation product of trimethylolpropane having an OH number of 56.

Catalyst (d):

N,N-dimethyl cyclohexylamine

Auxiliary (e1):

A standard commercial molecular-sieve zeolite (Baylith W, a product of Bayer AG) having a pore diameter of 0.74 nm, powder-form, maximum particle diameter approx. 10 μm, water content: 2% by weight, measured as ignition loss at 800° C.

Auxiliary (e2):

A standard commercial molecular-sieve zeolite (Baylith W, a product of Bayer AG) having a pore diameter of 0.74 nm, powder-form, maximum particle diameter approx. 10 nm, water content 20% by weight, measured as ignition loss at 800° C.

Auxiliary (e3):

A dry, commercial molecular-sieve zeolite (Baylith W, a product of Bayer AG) having a pore diameter of 0.74 nm in powder form (with a maximum particle diameter of approx. 10 nm) was treated with $CO_2$ at atmospheric pressure. $CO_2$ was adsorbed with evolution of heat. This process was continued until the powder was constant in weight. It then contained approx. 20% by weight of $CO_2$. By "dry zeolite" is meant a product dried at 400° C. It still contains about 2% of water, although this water is not accessible to the normal reaction with isocyanates.

Additive (e4):

A commercial polyether siloxane (Tegostab OS 50, a product of Goldschmidt AG, 4300 Essen 1).

The "polyol mixtures" set out in Table 1 below were prepared from the above-mentioned starting materials (b), (d) and (e) by mixing at room temperature using water, carbon dioxide gas or monofluorotrichloromethane. The quantities of water shown are based on the water additionally introduced and do not include the water present in the zeolite. The quantities of zeolite shown are based on the zeolite including water present therein. The $CO_2$ gas used in Example 6 was introduced by initially introducing the polyol mixture containing the powder-form dry zeolite into a closed stirred vessel and then introducing carbon dioxide while stirring. The quantity of gas introduced was determined through the weight loss of a carbon dioxide cylinder.

The polyol mixtures shown in Table 1 are processed with the quantity of polyisocyanate component (a) likewise shown in Table 1.

TABLE 1

| | (the figures are parts by weight) | | | | | |
|---|---|---|---|---|---|---|
| | EXAMPLE | | | | | |
| Component | 1 | 2 | 3 | 4 | 5 | 6 |
| (b1) | 55 | 55 | 55 | 55 | 55 | 55 |
| (b2) | 36.8 | 36.8 | 36.8 | 36.8 | 36.8 | 36.8 |
| Water | 1.2 | — | 0.8 | — | — | — |
| $CO_2$ | — | — | — | — | — | 2.9 |
| $CFCl_3$ | — | — | — | 6 | — | — |
| (d) | 1 | 1 | 1 | 1 | 1 | 1 |
| (e1) | 6 | — | — | — | — | 12 |
| (e2) | — | 7.2 | — | — | — | — |
| (e3) | — | — | — | — | 15 | — |
| (e4) | 1 | 1 | 1 | 1 | 1 | 1 |
| (a) | 150 | 150 | 145 | 133 | 133 | 133 |
| NCO index | 110 | 110 | 110 | 110 | 110 | 110 |

GENERAL OBSERVATIONS ON THE EXAMPLES:

Plate-like foam moldings having a gross density of 400 to 700 kg/m³ were produced using the formulations shown in Table 1 (cf. Table 2). The mold used was a plate mold measuring 10×200×200 mm wherein the inner walls had been coated with a commercial, wax-based external mold release agent (Acmosil 180, a product of Acmos, D-2800 Bremen 1). Before processing, the polyol mixtures were charged with 10% by volume, based on atmospheric pressure, of finely dispersed air by brief stirring at high speed (20 minutes at 1000 r.p.m., propeller stirrer).

The reaction mixtures were prepared from the polyol mixtures and the polyisocyanate component (a) using a standard stirred mixer. The density of the particular moldings was determined by the quantity of the particular reaction mixture introduced into the mold.

EXAMPLES 1 AND 2:

Examples according to the invention using waer and zeolitic adsorbent.

EXAMPLE 3:

Comparison Example without a zeolitic adsorbent.

EXAMPLE 4:

Comparison Example using monofluorotrichloromethane (conventional integral foam of high hardness).

EXAMPLE 5:

Example according to the invention using carbon dioxide adduct with the zeolitic adsorbent (the carbon dioxide was adsorbed onto the zeolite before preparation of the mixture).

EXAMPLE 6:

Example according to the invention using carbon dioxide as the principal blowing agent togther with zeolitic adsorbent.

The surface hardness Snore D of the individual foam moldings is shown in Table 2 below:

TABLE 2

| Gross density (kg/m³) | Examples | | | | | |
|---|---|---|---|---|---|---|
| | 1 | 2 | 3 | 4 | 5 | 6 |
| 400 | 56 | 55 | 50 | 64 | — | — |
| 500 | 64 | 65 | 57 | 71 | — | — |
| 600 | 70 | 70 | 61 | 74 | 74 | 73 |

TABLE 2-continued

| Gross density (kg/m³) | Examples | | | | | |
|---|---|---|---|---|---|---|
| | 1 | 2 | 3 | 4 | 5 | 6 |
| 700 | 72 | 73 | 64 | 75 | — | — |

The surface hardness of Examples 1 and 2 according to the invention was distinctly higher at all gross densities than that of the zeolite-free Comparison Example (3). It was only slightly below the surface hardness of the integral foam produced without water using R 11 as blowing agent (Comparison Example 4). The surface hardness achieved with $CO_2$/zeolite (Examples 5 and 6) was also distinctly higher than that of Comparison Example (3). As can be seen, it does not matter whether water or carbon dioxide was used in the form of adducts with a zeolite or whether the zeolite was first charged with the particular quantities of water or carbon dioxide in the polyol mixture.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a fluorocarbon-free, rigid polyurethane foam molding having a gross density of at least 300 kg/m³ by in-mold foaming a reaction mixture comprising
   (a) a polyisocyanate component comprising at least one aromatic polyisocyanate,
   (b) at least one organic polyhydroxyl compound having an (average) hydroxyl functionality of at least 2.2 and an average OH number of at least 300 mg KOH/g,
   (c) a blowing agent comprising water and/or carbon dioxide,
   (d) a catalyst for the reaction between isocyanates and hydroxyl groups and
   (e) a zeolitic absorbent having a pore diameter of at least 0.7 nm.

2. The process of claim 1 wherein the blowing agent consists of water in an amount, including the water bound to said zeolitic absorbent of at least 0.5% by weight, based on the weight of component (b).

* * * * *